United States Patent [19]

Jacobs et al.

[11] 4,057,831

[45] Nov. 8, 1977

[54] VIDEO RECORD DISC MANUFACTURED BY A PROCESS INVOLVING CHEMICAL OR SPUTTER ETCHING

[75] Inventors: Bernardus Antonius Johannus Jacobs; Johannes van der Wal; Gerrit Berend Gerritsen, all of Eindhoven, Netherlands

[73] Assignee: U.S. Philips Corporation, New York, N.Y.

[21] Appl. No.: 713,521

[22] Filed: Aug. 11, 1976

Related U.S. Application Data

[60] Continuation of Ser. No. 527,245, Nov. 26, 1974, abandoned, which is a division of Ser. No. 344,865, March 26, 1973, Pat. No. 3,894,179, which is a continuation-in-part of Ser. No. 344,636, March 26, 1973, abandoned.

[30] Foreign Application Priority Data

Sept. 5, 1972 Netherlands .......................... 7212045

[51] Int. Cl.$^2$ ....................... B32B 3/00; C23C 15/00; G11B 11/12; G11B 25/04; H04N 5/86
[52] U.S. Cl. .................................... 358/128; 96/36; 156/659; 179/100.3 V; 204/192 E; 204/192 EC; 428/64; 428/203; 428/209; 428/210; 428/222
[58] Field of Search .................... 204/192 E, 192 EC; 96/36; 156/8; 428/37, 222, 428, 448, 450, 203, 209, 210, 64; 178/6.6 R; 358/128

[56] References Cited

U.S. PATENT DOCUMENTS

| | | | |
|---|---|---|---|
| 3,287,563 | 11/1966 | Clunis | 178/6.6 |
| 3,534,166 | 10/1970 | Korpel | 178/6.6 |
| 3,560,280 | 2/1971 | Nishida | 156/8 |
| 3,642,548 | 2/1972 | Eger | 156/8 |
| 3,688,025 | 8/1972 | Whettemore | 178/6.6 |
| 3,919,066 | 11/1975 | Bertens | 204/192 EC |
| 3,957,609 | 5/1976 | Sasano | 204/192 E |
| 3,984,300 | 10/1976 | Ommeren | 204/192 E |

OTHER PUBLICATIONS

Davidse, J. Electrochem. Soc., 116(1), 100–103 (1/1969).
Rice et al, J. of S.M.P.T.E., 78(11), 997–1002 (1970).
Oliver, Def. Pub. Search Copy of Serial No. 571,633, Filed 8/10/66, Published in 856 O.G. 1019 on 11/26/68 Defensive Publication No. T 856,040 96–36.2.

Primary Examiner—J.C. Cannon
Attorney, Agent, or Firm—Frank R. Trifari; Simon L. Cohen

[57] ABSTRACT

A mother for manufacturing long-playing video records is provided by (1) selectively exposing a photoresist disposed as the outer layer on a substrate comprising a disc-shaped plate, a thin layer of base material, e.g., an oxide of nitride, adhering to the plate and a thin metal layer, e.g., chromium, silver, nickel or titanium, coating the base material layer, (2) removing non-activated sections of the photoresist layer and (3) sputter or chemically etching the thin metal and base material layers in sections corresponding to the removed sections of the photoresist layer.

4 Claims, 5 Drawing Figures

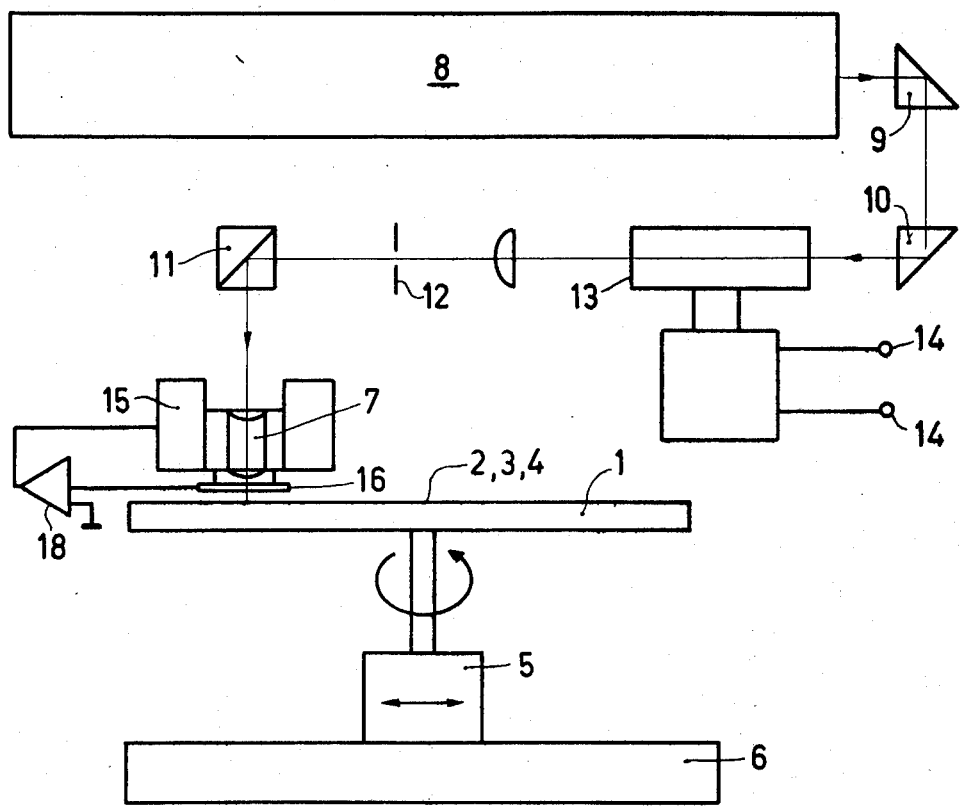
Fig. 1
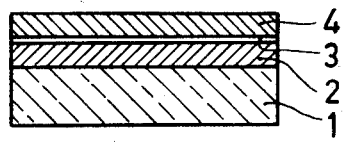
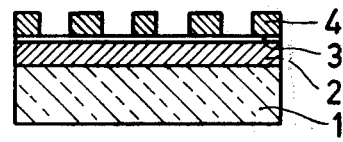
Fig. 2a	Fig. 2b
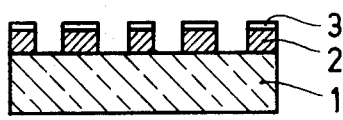
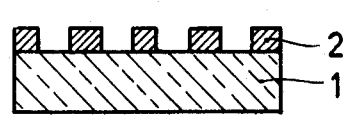
Fig. 2c	Fig. 2d

VIDEO RECORD DISC MANUFACTURED BY A PROCESS INVOLVING CHEMICAL OR SPUTTER ETCHING

This application is a continuation of application Ser. No. 527,245, filed Nov. 26, 1974, and now abandoned, which was a divisional of Ser. No. 344,865, filed Mar. 26, 1973, now U.S. Pat. No. 3,894,179, which was a continuation-in-part of Ser. No. 344,636, filed Mar. 26, 1973, and now abandoned.

The invention relates to a disk-shaped information carrier provided with an information track which is spiral or built up from concentric circles.

Disk-shaped information carriers are known in the form of disk records on which an audio and/or video track is provided. The information is reproduced by mechanical scanning of the information track. Other disk-shaped information carriers are, for example, magnetic disk stores which generally are used for storing data.

The information carrier according to the invention is intended for reading and writing the information by optical means. It is particularly suitable for use as a mother by means of which a nearly indefinite number of pressings can be made which can be played back by means of a suitable optical apparatus. Co-pending Netherlands Patent Application No. 7,102,863 corresponding to U.S. Ser. No. 229,285, filed Feb. 25, 1972, abandoned in favor of continuation application Ser. No. 396,399, filed Sept. 12, 1973, which was abandoned in favor of continuation application Ser. No. 618,215, filed Sept. 30, 1975, relates to such information carriers and pressings in which the information is recorded in the form of blocks of variable length on the spiral or multicircular track. The term "substantially spiral" as used hereinafter shall mean spiral or multicircular. The information carrier according to the invention is characterized by a disk-shaped base which is coated with at least one tightly adhering thin layer which can be removed by means of a selective process which substantially does not attack the base, the material of each thin layer being removed over parts of the information track down to the surface of the base. The variation in the lengths of the removed and/or non-removed parts contain the information.

A method according to the invention suitable for manufacturing a disk-shaped information carrier provided with an information track which is spiral or built up from concentric circles is characterized in that the disk-shaped information carrier is coated with a photoresist which by rotation of the disk relative to a point source of light, in particular a laser, is intermittently exposed and non-exposed for variable periods which correspond to the information. The desired information track is obtained after development of the photoresist. This simple process is sufficient if no copies are to be made. Even if only one or a few copies of the information carrier are to be made (for example for filing purposes), further treatment of the carrier may be dispensed with. In such a case in particular thermoplastic materials may be used in which the desired information track is formed under the influence of the incident light and by a subsequent known treatment.

If more than a few copies are to be made, in an advantageous embodiment of the method according to the invention the desired information track may be obtained, after development of the photoresist, by means of a photolithographic process.

In the method according to the invention a highly reliable process having a very high resolution is used for providing the desired information track. The process automatically bypasses aligning and centering problems. The "thin layer" used further enables the desired difference in height between the blocks from which the information track is built up to be maintained throughout the entire surface area of the disk.

An embodiment of the invention will now be described, by way of example, with reference to the accompanying diagrammatic drawings, in which:

FIG. 1 shows an apparatus for carrying out the method according to the invention, FIG. 2a shows a first stage of the information carrier obtained by this method.

FIG. 2b shows a second stage in the formation of the information carrier.

FIG. 2c shows a third stage in the formation of the information carrier, and

FIG. 2d shows a fourth stage in the formation of the information carrier.

Referring now to the Figures, reference numeral 1 denotes a glass plate which has to satisfy exacting requirements in respect of scratches, dimples and microscopic irregularities (abrupt variations in surface level of less than, for example, 1 : 1000), but the microscopic flatness of which need not be better than, for example 30 μm. After the plate has been cleaned it is coated with a tightly adhering base layer 2. (FIG. 2a) which preferably is non-conductive or poorly conductive, is resistant to scratching and wear and is readily etchable. An example of such a base layer is $SiO_x$, where $x$ lies between 1 and 2, which is deposited on the plate 1 from vapour in a vacuum chamber. This technique ensures that the layer 2 satisfies the required height tolerances over the entire surface area of the plate. The base layer 2 is then coated with a very thin metal film 3. An example of a suitable metal for this film is chromium which can be deposited substantially without flaws by means of a sputtering process. The film is then coated with a layer 4 of a photoresist. The thickness of the last layer is chosen so that the light can penetrate into it to a sufficient depth, and yet accurate and reproducible information can be recorded in it.

The plate 1 has a circular circumference and is set into rotation about its axis by means of a motor 5 which is radially movable by means of a carriage 6. Above the plate 1 an optical system 7 is disposed by means of which the light from a laser 8 is focussed on the plate 1 via prisms 9, 10 and 11. A stop 12 and a light modulator 13 are inserted in the path of the radiation from 8 to 7 to ensure that during a time which corresponds to the presence of information at the terminals 14 a spot of light is imaged on the photoresist layer of the plate 1.

If the carriage 6 moves uniformly, the photoresist layer on the plate 1 will intermittently be exposed and non-exposed in accordance with the information along a spiral track; if the carriage is shifted one step after each revolution, concentric circular tracks will be similarly exposed. The luminous intensity is made inversely proportional to the distance from the axis of rotation of the plate, so that the product of luminous intensity and exposure time remains constant.

Depending upon the type of photoresist, development will cause either the exposed or the unexposed parts to be removed (FIG. 2b). After the subsequent etching operation the material of the film 3 and the layer 2 will be removed from the sites not covered by the photoresist layer 4. This etching may in principle be performed by means of at least one suitable etchant, for example a first bath which dissolves the metal of the film 3 and then a second bath which removes the material of the base layer 2. Preferably a sputtering process is used in which by means of a rare-gas discharge the material of the film 3 and the layer 2 is removed from the desired sites, while the plate 1 is substantially not attacked.

The thicknesses and the materials of the various coatings are chosen so that the layer 2 is etched through before the photoresist 4 is. Thus a reliable final result (FIG. 2c) is obtained.

The metal film 3 has a plural function. Firstly, the photoresist layer 4 adheres very tightly to it, preventing the risk of underetching at the sites at which the photoresist layer has remained intact. Thus the film 3 also forms a protection against undesirable underetching of the layer 2. Furthermore, the layer 3 reflects the incident light, so that this is utilized as efficiently as possible at the required sites.

Another function of the metal film 3 is illustrated in the apparatus shown in FIG. 1. The optical system 7 is arranged so as to be axially (i.e. vertically) movable with respect to the plate 1 and can be displaced by energization of a magnet coil 15. The movement of the system 7 is followed by a metal conductor 16 which together with the film 3 on the plate 1 forms a capacitor of variable value. If due to unevenness of the plate 1 this capacitor should tend to vary, the current flowing through the coil 15 is automatically controlled by means of a control device 18 so that the said variation is cancelled and the focussing of the source 8 on the photoresist layer is ensured.

Alternative solutions are described in co-pending Netherlands Patent Application No. 7,206,377 corresponding to U.S. Ser. No. 358,994, filed May 10, 1973, now U.S. Pat. No. 3,876,841, issued Apr. 8, 1975. This application describes an apparatus for reading a flat reflecting record carrier on which information is recorded in at least one track which has an optical structure, which apparatus comprises a source of radiation and a radiation-sensitive signal detection system for converting a read beam supplied by the source and modulated by the information into electric signals. The insertion of one and the same image-forming element in the path of the radiation from the radiation source to the location of the record carrier and in the path of the radiation between this location and the signal detection system enables signals which give an indication of the deviation between the actual position of the plane of a track part to be read and the desired position of this plane to be generated in additional radiation-sensitive detectors without the information stored in the record carrier being used.

The obtained information carrier shown in FIG. 2c may directly serve for reading the information. Removal of the metal film 3 produces a "mother" as illustrated in FIG. 2d.

This mother may be used by means of conventional techniques to produce at least one pressing which in turn may serve as a stamper for information carriers made of a synthetic material. In analogy with the technique commonly used in manufacturing gramophone records the mother can be rendered conductive by means of a chemical silvering solution and then be nickeled by electroforming to a thickness sufficient to permit it to be used as a stamper. In this process it is important that the layer 2 should have the (aforementioned) properties to enable the stamper to be separated from the mother without damage.

An example of a chemical silvering solution is an ammoniacal silver salt solution which contains a tartrate and/or formaldehyde. The conventional electroplating nickel bath contain nickel as a sulphate, a sulphamate or a fluoborate.

In principle the metal film 3 may be left on the mother. Before the mother is coated with the thin silver layer, as a rule the metal film must be provided with a parting layer to facilitate release of the pressing. If a chromium layer is used, this may be slightly oxidized superficially.

Another possibility is to coat the mother, after its metal surface has been slightly oxidized and then activated, for example by means of a solution of $SnCl_2$ and $PdCl_2$, with a thin phosphor-containing nickel layer in an electroless manner by means of a solution which contains a nickel salt, a complexing agent for nickel ions and a hypophosphite as a reducing agent. This thin layer may in turn be coated with a thick nickel layer by electroforming. The thin phosphor-containing nickel layer, which becomes the surface of the stamper, is of advantage owing to its hardness which increases the resistance to wear of the stamper.

In principle modified embodiments of the invention may be used which lead to similar results. For example, the base layer may be made of another material which satisfies the aforementioned etching conditions, for example another oxide or a nitride, provided it has a sufficiently high etching rate. In particular $In_2O_3$ is suitable. The metal film may consist of silver, nickel or titanium instead of chromium.

It is even possible to directly manufacture a stamper for moulding pressings by means of the method described, for example by starting from a chromium steel plate (which also must satisfy the aforementioned exacting requirements in respect of microscopic irregularities), which may be coated with silver, for example by electrodeposition, which in turn is coated with a layer of a photoresist which then is exposed in the manner described with respect to FIG. 1, so that after development the desired information track may be etched in the silver (or, as the case may be, in the chromium plate itself). The resulting information carrier is hard and strong enough for direct use as a stamper for moulding pressings.

What is claimed is:

1. A disc-shaped information carrier comprising a disc-shaped plate and a substantially spiral information-providing track on a surface of said plate produced by subjecting a tightly adhering thin layer of base material disposed on said plate and a thin metal layer coating said base material layer to a sputter etching process to selectively remove portions of the thin metal layer and the underlying base material layer from the surface of said plate.

2. Information carrier as claimed in claim 1, wherein the metal layer consists of chromium.

3. Information carrier as claimed in claim 1, wherein the plate is a flat glass plate.

4. Information carrier as claimed in claim 3, wherein the thin film consists of an oxide or a nitride, in particular silicon oxide or indium oxide.

* * * * *